Patented May 27, 1952

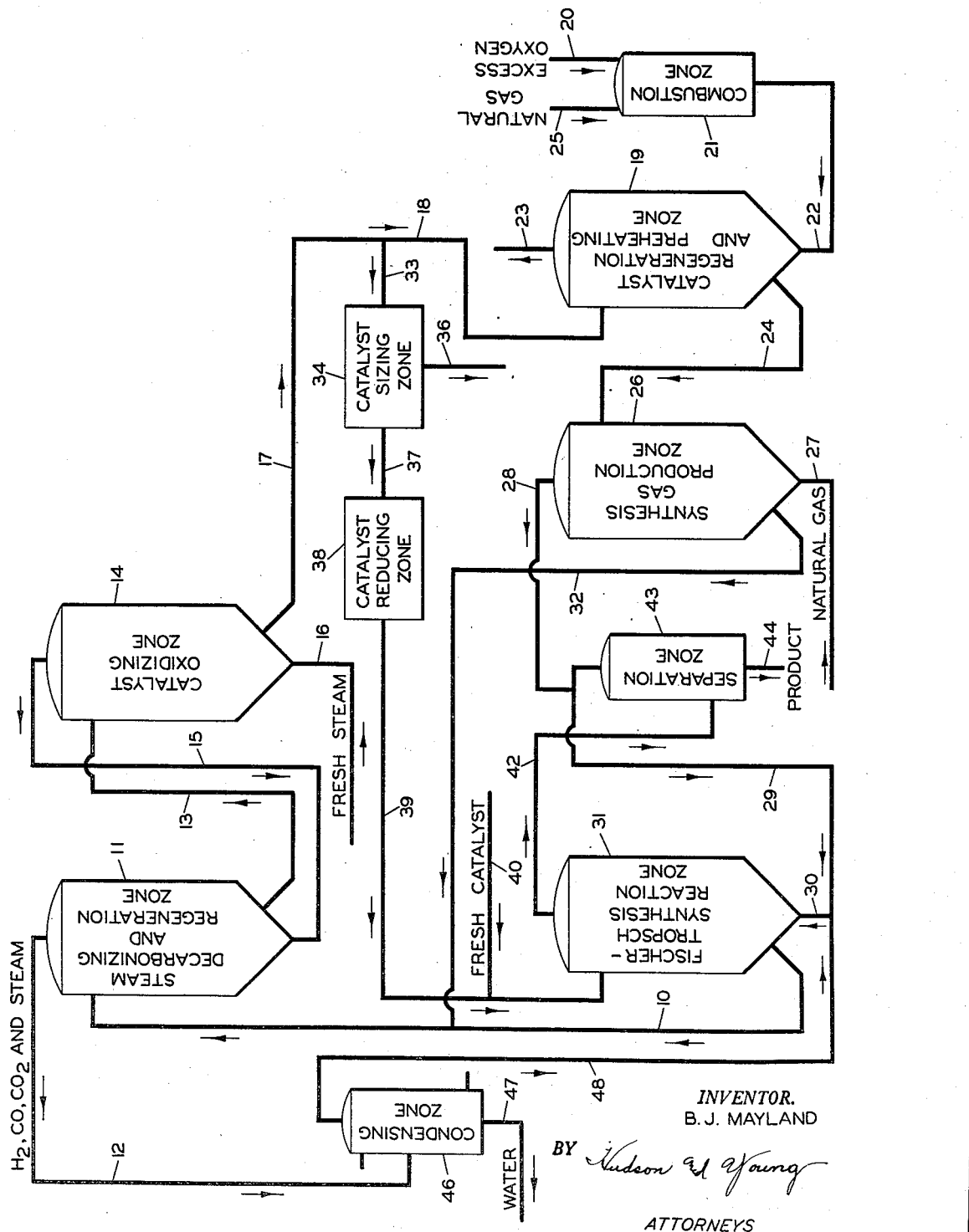

2,598,186

UNITED STATES PATENT OFFICE 2,598,186

PROCESS FOR USE OF SPENT FISCHER-TROPSCH CATALYST FOR MANUFACTURE OF CARBON MONOXIDE-HYDROGEN SYNTHESIS GAS

Bertrand J. Mayland, Bartlesville, Okla., assignor to Phillips Petroleum Company, a corporation of Delaware Application December 20, 1948, Serial No. 66,365

8 Claims. (Cl. 260—449.6)

This invention relates to a process for the production of carbon monoxide-hydrogen synthesis gas. In one of its more specific aspects it relates to a process for the use of spent Fischer-Tropsch catalyst for the production of carbon monoxide-hydrogen synthesis gas by the iron-oxide-natural gas reaction.

There has been a never ending attempt by the petroleum industry to produce greater quantities of materials more rapidly and with greater economy. One of the many methods for producing hydrocarbons and oxygenated compounds is by the process developed in Germany by Fischer and Tropsch. They discovered that hydrocarbons may be made by reacting carbon monoxide with hydrogen over suitable catalysts and under certain conditions. An inherent result of this process as practiced today using an iron catalyst is the formation of carbon on the catalyst. In time, due to the carbon and wax depositions, the catalyst becomes less and less active, and must have these deposits periodically removed in suitable regeneration means. This has been done in a number of different ways, many of them comprising burning the deposits off by combustion with an oxygen containing gas.

It is an object of this invention to provide a process for utilizing spent Fischer-Tropsch catalyst for the manufacture of carbon monoxide and hydrogen synthesis gas.

Another object of this invention is to provide a process for the manufacture of carbon monoxide and hydrogen synthesis gas by utilizing a spent Fischer-Tropsch catalyst which has become at least partially inactive due to the wax and carbon depositions thereon.

Another object of this invention is to provide a process for the manufacture of carbon monoxide-hydrogen synthesis gas by the iron oxide-natural gas reaction utilizing a spent Fischer-Tropsch catalyst and thereby regenerating the spent catalyst.

Further objects and advantages of this invention will be apparent to one skilled in the art from the accompanying disclosure and discussion.

I have discovered that a spent Fischer-Tropsch catalyst may be used in such a manner that in one step it furnishes carbon to a process for the manufacture of carbon monoxide and hydrogen synthesis gas and in a second step, furnishes oxygen to a natural gas oxidation for producing synthesis gas. Catalysts which are adaptable to my process are those, which are well known to those skilled in the art, containing iron, cobalt, nickel, and the like, with iron being usually preferred.

In accordance with my invention a spent finely divided Fischer-Tropsch catalyst, which has built up a carbon deposit and whose efficiency for conversion of carbon monoxide and hydrogen to the desired products has fallen off, is utilized to produce carbon monoxide and hydrogen synthesis gas. I have found that a Fischer-Tropsch catalyst, particularly reduced iron, may retain a great deal of activity which is merely blanketed, so to speak, by the carbon deposits and by wax and the like. It is not infrequent to find such catalysts which have as much as 50 volume per cent of carbon deposited thereon. Because this catalyst still retains a great deal of its activity, it is economically desirable to regenerate the catalyst by removing the deposited carbon and other materials which have reduced its efficiency. In conventional regeneration processes, where the deposits are merely burned off, there is a danger of overheating the catalyst particles and causing fusion because of the heat generated in burning off the carbon and oxidizing the reduced iron.

According to a preferred embodiment of my process, a spent Fischer-Tropsch catalyst is passed to a decarbonizing and regenerating zone along with catalyst from an iron oxide-natural gas reaction, similar to that disclosed in my copending application, Serial No. 49,826, filed September 17, 1948, which reaction has obtained its iron oxide from a Fischer-Tropsch synthesis process, where it is contacted with steam and hydrogen at an average temperature level of 1100 to 1200° F., thus removing the materials which have reduced its efficiency and forming carbon monoxide, carbon dioxide, and hydrogen. Since the steam-carbon reaction proceeds fairly rapidly at temperatures as low as 1100° F., sufficient heat is available to complete the removal of the carbon. The heat for the reaction is supplied by the catalyst from the iron-oxide natural gas reaction which may take place at temperatures in the range of 1400 to 2000° F. The catalyst may be removed from its reaction zone at a temperature within the above reaction temperature range and it is often desirable to withdraw it at a temperature in the neighborhood of 1600° F. This catalyst is then cooled by the steam reaction while the catalyst from the Fischer-Tropsch synthesis is heated, the average temperature being about 1100 to 1200° F. The product gases from the decarbonizing step in which the reduced iron catalyst from the Fischer-Tropsch synthesis is oxidized, are utilized as supplemental synthesis gas for the hydrocarbon synthesis process.

The decarbonized catalyst which has been partially oxidized is next treated with fresh steam.

Because the oxidation of reduced iron proceeds at high rates in the presence of steam at temperatures as low as 800° F., the iron can be reoxidized at least partially by continued contact with steam until the temperature drops below 900° F. The sensible heat of the iron oxide is utilized to superheat the steam which is then used in the decarbonizing zone. The reaction is very mildly exothermic and will furnish only a portion of the heat required, thus the remaining heat is supplied when the catalyst is cooled from about 1200 to about 900° F. Hydrogen liberated in this step passes along with the steam to the decarbonizing and regenerating step where it aids in removing wax deposits from the catalyst which is a conventional process and where it may be incorporated with the synthesis gas produced in that step.

A portion of the catalyst which has been decarbonized and contacted with fresh steam is passed to a reducing step wherein it is prepared for re-use in the Fischer-Tropsch synthesis of hydrocarbons by any conventional means such as passing hydrogen through it at an elevated temperature. This freshly reduced catalyst is added to the Fischer-Tropsch reaction as spent catalyst is withdrawn.

The remaining portion of the fresh-steam treated catalyst is passed to a final catalyst regenerating and preheating zone where it is contacted with hot combustion gases containing an excess of oxygen usually in the form of air. In this zone the catalyst is completely oxidized to iron oxide and preheated to a temperature in the range of 2300 to 2800° F. This catalyst is passed to a natural gas-iron oxide zone where the natural gas is converted to carbon monoxide and hydrogen in a preferred mol ratio of hydrogen to carbon monoxide of 1.7:1 to 2.3:1 by combining with the oxygen of the iron oxide. Some cracking of the natural gas takes place depositing carbon on the catalyst, or as it might be called, oxygen donor. From here on the cycle repeats itself. The catalyst from this synthesis gas producing zone and from the hydrocarbon synthesis zone containing carbon deposits are passed to the decarbonizing zone and treated as hereinabove described.

It is advantageous to carry out the process of my invention in a fluidized phase, that is, maintaining the solid particles of catalyst in a highly turbulent state by passing a gas therethrough, because the finely divided Fischer-Tropsch catalyst may be most easily handled in this manner and because better conversion in the synthesis step and better contact in all the steps of the process are obtained. It is also of advantage to utilize fluidized phase operation because it is more easily maintained continuous and requires less equipment per unit quantity of product.

A clear understanding of some of the many aspects of my invention may be had by referring to the attached drawing, which is a schematic flow diagram, in conjunction with the following discussion. Various additional valves, pumps, and other conventional equipment, necessary for the practice of this invention will be familiar to one skilled in the art and have been omitted from the drawing for the sake of clarity. The description of the drawing provides one method of operating my process; however, while this is representative in general of my process, various minor changes may be made in adapting the process to the various conditions within the scope of the invention. The following discussion will also serve to exemplify my invention.

Spent Fischer-Tropsch catalyst is passed through line 10 to steam decarbonizing and regenerating zone 11. The carbon deposited on the catalyst along with other contaminating materials, such as wax and the like, are reacted with steam and hydrogen from zone 14, hereinafter described, at a temperature in the range of 1100 to 1250° F. and preferably in the range of 1150 to 1200° F. to form carbon monoxide, carbon dioxide, hydrogen, and steam. These products are removed from zone 11 via line 12 and passed to a Fischer-Tropsch synthesis unit hereinafter discussed. Below 1100° F. the reaction rate becomes too slow, however, in order to furnish the heat of reaction from the sensible heat of the recycled catalyst in line 32, the temperature should be as low as possible. These factors fix the temperature within the above stated preferred range. The decarbonized catalyst, which is also partially oxidized, is passed via line 13 to catalyst oxidizing zone 14 where it is contacted with fresh steam introduced thereto via line 16. Temperatures within zone 14 are maintained in a range of 800 to 1000° F. The off gas from zone 14 is removed via line 15 and passed to zone 11. Oxidized catalyst is removed from zone 14 via line 17. A portion of this catalyst is passed via line 18 to catalyst regeneration and preheating zone 19. Natural gas and excess oxygen are introduced via lines 25 and 20 to combustion zone 21 where they are burned to provide heat and oxygen for treatment of the catalyst in zone 19. The hot combustion gases are passed via line 22 to the regeneration and preheating zone. In this zone, the catalyst is completely oxidized to iron oxide and is preheated to a temperature in the range of 2300 to 2800° F. Usually, however, it is preferred to heat the iron oxide to a temperature in the range of 2300 to 2600° F. because temperatures around 2800° F. may cause fusing. Cooled combustion gas is removed from zone 19 via line 23. Regenerated and heated catalyst is then passed from zone 19 via line 24 to synthesis gas production zone 26 where the natural gas or other hydrocarbon material introduced via line 27 is oxidized to carbon monoxide and hydrogen by the iron oxide at a temperature in the range of 1500 to 2000° F., but preferably in the range of 1550 to 1700° F. Carbon monoxide and hydrogen synthesis gas produced in zone 26 preferably in a mol ratio of hydrogen to carbon monoxide in the range of 1.7:1 to 2.3:1 is passed therefrom via lines 28, 29, and 30 to Fischer-Tropsch synthesis reaction zone 31. Reduced iron oxide from zone 26 is passed via line 32 to line 10 through which it is passed along with spent catalyst from zone 31 to steam decarbonizing and regenerating zone 11.

The remaining portion of catalyst removed from zone 14 via line 17 is passed through line 33 to catalyst sizing zone 34 where fines and agglomerated particles may be removed via line 36. From zone 34, the catalyst is passed via line 37 to catalyst reducing zone 38. The catalyst in zone 38 may be reduced by any suitable means such as are well known to those skilled in the art; for example, by use of hot hydrogen, for use in the Fischer-Tropsch synthesis reaction. The catalyst, after reduction, is passed via line 39 to Fischer-Tropsch synthesis reaction zone 31. Fresh makeup catalyst may be introduced to zone 31 via lines 40 and 39. Products from zone 31 are removed via line 42 and passed to separation zone 43 where the tail gas is removed for recycle via lines 29 and 30 to zone 31. Separation zone 43 may be any suitable separation means such as a flash chamber, an accumulator, or the like. Product materials are removed from zone 43 via line 44. Synthesis gas produced in the steam decarbonizing and regenerating zone 11 along with the hydrogen produced in the catalyst oxidizing zone 14 is passed from zone 11 via line 12 to condensing zone 46 where steam is condensed to water and removed through line 47. The remaining synthesis gas, which may also contain some carbon dioxide, is passed via lines 48 and 30 to the previously discussed Fischer-Tropsch synthesis reaction zone 31.

The various treatments involving iron oxide and reduced iron oxide take place preferably at about atmospheric pressure, although higher or lower pressures may be used. Space velocities range from 300–3000 volume of gas per volume of iron or iron compound per hour.

The spent Fischer-Tropsch catalyst as used in my process may have the same activity as the catalyst which remains in the Fischer-Tropsch reaction zone. However, to maintain a particular level of catalyst activity and a continuous process a portion of the catalyst must be continually removed from the reaction zone while fresh regenerated catalyst is introduced thereto.

Advantages of my invention are many. Complete use of a Fischer-Tropsch catalyst is made, in that, even during the regeneration step, it is producing useful materials. Also an almost complete utilization of heat is had by the specific arrangement of the process steps. The process steps are arranged according to diminishing heat requirements thus affording greater economy of operation.

Although this process has been described in terms of its preferred modifications, it is understood that various changes may be made without departing from the spirit and scope of the disclosure of the claims.

I claim:

1. A process for the use of spent Fischer-Tropsch catalyst selected from the group consisting of iron, cobalt, and nickel and spent oxygen donor selected from a group consisting of the oxides of iron, cobalt and nickel from a Fischer-Tropsch synthesis gas producing process capable of acting as a Fischer-Tropsch hydrocarbon synthesis catalyst when in a reduced state, which comprises passing said spent Fischer-Tropsch hydrocarbon synthesis catalyst in admixture with said spent oxygen donor from a Fischer-Tropsch synthesis gas producing process at a temperature of 1400 to 2000° F. to steam decarbonization and regeneration, contacting the mixture with steam and hydrogen at a temperature of 1100 to 1250° F. and thereby removing all of the carbon and waxes deposited on said spent catalyst and partially oxidizing said spent catalyst and said spent oxygen donor, passing the partially oxidized material at a temperature of 1100 to 1250° F. in contact with steam and thereby more fully oxdizing said material and cooling same to a temperature of 800 to 950° F., passing at least a portion of the more fully oxidized material to regeneration and preheat where it is contacted with a hot gas containing excess oxygen and is completely oxidized and heated to a temperature in the range of 2300 to 2800° F., contacting thus heated and oxidized material as an oxygen donor with natural gas and thereby converting said gas to carbon monoxide and hydrogen by partial oxidation at a temperature of 1500 to 2000° F., and reducing the remaining portion of said more fully oxidized material and using the same as a catalyst in a Fischer-Tropsch synthesis of hydrocarbons.

2. A process according to claim 1 wherein said spent oxygen donor is passed to said Fischer-Tropsch synthesis of hydrocarbons as additional catalyst thereof.

3. A process according to claim 1 wherein said spent Fischer-Tropsch hydrocarbon synthesis catalyst is reduced iron oxide and said spent oxygen donor is reduced iron oxide.

4. A process according to claim 1 wherein said fresh steam contacted with the decarbonized material is superheated by contacting the decarbonized material for decarbonization of other spent material.

5. A process according to claim 1 wherein the natural gas partial oxidation products are passed to said Fischer-Tropsch synthesis of hydrocarbons.

6. A process according to claim 1 wherein the hydrogen and carbon monoxide produced by the decarbonization and partial oxidation of said spent Fischer-Tropsch catalyst is passed to said Fischer-Tropsch synthesis of hydrocarbons.

7. A process for the use of spent Fischer-Tropsch catalyst selected from the group consisting of iron, cobalt, and nickel and spent oxygen donor selected from the group consisting of the oxides of iron, cobalt, and nickel from a Fischer-Tropsch synthesis gas producing process capable of acting as a Fischer-Tropsch hydrocarbon synthesis catalyst when in a reduced state, which comprises passing a mixture containing said spent Fischer-Tropsch hydrocarbon synthesis catalyst and said spent oxygen donor from a Fischer-Tropsch synthesis gas producing process to steam decarbonization and regeneration, contacting said mixture with steam and hydrogen and thereby removing all of the carbon and waxes deposited on said catalyst and partially oxidizing said catalyst and said oxygen donor, said spent oxygen donor carrying sufficient heat from the synthesis gas producing process to the decarbonization and regeneration to cause decarbonization and oxidation of said mixture, completely oxidizing and preheating at least a portion of the resulting mixture by contacting same with hot gases containing an excess of oxygen, utilizing said hot oxidized material as an oxygen donor and heat supplier in a Fischer-Tropsch synthesis gas producing step, and reducing the remaining portion of the resulting mixture and using same as a catalyst in a Fischer-Tropsch synthesis reaction.

8. A process for the use of spent Fischer-Tropsch reduced iron oxide catalyst and spent iron oxide oxygen donor from a Fischer-Tropsch synthesis gas producing process capable of acting as a Fischer-Tropsch hydrocarbon synthesis catalyst when in a reduced state, which comprises passing deactivated reduced iron oxide catalyst from a Fischer-Tropsch hydrocarbon synthesis reaction in admixture with spent iron oxide at a temperature of 1600° F. used as an oxygen donor in a Fischer-Tropsch synthesis gas producing process to steam decarbonization and regeneration, contacting the mixture with superheated steam and hydrogen at a temperature of 1150 to 1200° F. and thereby removing all of the carbon and waxes deposited on said spent catalyst as carbon oxides, steam, and hydrogen and partially oxidizing said spent catalyst and said spent oxygen donor, heat for this treatment being supplied from the spent oxygen donor, passing the resulting partially oxidized material at a temperature of 1150 to 1200° F. in contact with fresh steam and thereby more fully oxidizing said partially oxidized material and cooling same to a temperature of 850 to 950° F., passing a portion of the more fully oxidized material to regeneration and preheat where it is contacted with hot combustion gases containing an excess of oxygen and is preheated to a temperature of 2300 to 2600° F. and is fully oxidized, contacting the resulting iron oxide with natural gas at a temperature of 1550 to 1700° F. and partially oxidizing said gas to produce carbon monoxide and hydrogen, reducing the remaining portion of the more fully oxidized iron and passing same to a Fischer-Tropsch synthesis of hydrocarbons from the carbon monoxide and hydrogen produced by partial oxidation of said natural gas, and passing a portion of spent oxygen donor from said natural gas partial oxidation to said Fischer-Tropsch synthesis of hydrocarbons as desired, and treating spent Fischer-Tropsch catalyst and spent oxygen donor as hereinbefore described.

BERTRAND J. MAYLAND.

REFERENCES CITED

The following references are of record in the file of this patent:

UNITED STATES PATENTS

| Number | Name | Date |
|---|---|---|
| 1,899,184 | De Simo | Feb. 28, 1933 |
| 2,425,754 | Murphree et al. | Aug. 19, 1947 |
| 2,455,419 | Johnson | Dec. 7, 1948 |
| 2,467,803 | Herbst | Apr. 19, 1949 |
| 2,472,219 | Lyons | June 7, 1949 |
| 2,506,302 | Krebs | May 2, 1950 |